Sept. 26, 1967 J. L. DAGUET 3,344,352

TRANSMISSION SYSTEM FOR CONVERTING A BINARY INFORMATION SIGNAL TO A THREE LEVEL SIGNAL

Filed May 3, 1963 5 Sheets-Sheet 1

INVENTOR
JACQUES L. DAGUET
BY
Frank R. Jeffrey
AGENT

THESE WAVEFORMS CORRESPOND TO THE SIGNAL OUTPUTS (E.G. CURRENT OR VOLTAGE) OF THE INDICATED CIRCUIT AS A FUNCTION OF TIME.

INVENTOR.
JACQUES L. DAGUET
BY
[signature]
AGENT.

INVENTOR.
JACQUES L. DAGUET
BY
Frank R. Trifari
AGENT

INVENTOR
JACQUES L. DAGUET

INVENTOR.
JACQUES L. DAGUET
BY
Frank R. Trifari
AGENT

United States Patent Office 3,344,352

Patented Sept. 26, 1967

3,344,352

TRANSMISSION SYSTEM FOR CONVERTING A BINARY INFORMATION SIGNAL TO A THREE LEVEL SIGNAL

Jacques Lucien Daguet, Paris, France, assignor to North American Philips Company, Inc., New York, N.Y., a corporation of Delaware Filed May 3, 1963, Ser. No. 277,770
Claims priority, application France, May 7, 1962, 896,678
10 Claims. (Cl. 325—38)

The invention relates to an information transmission system, for example a telegraphy system, of the type in which the information to be conveyed is coded in a known manner into a series of input pulses having a same common amplitude. The pulses thus produced coincide with successive, regularly recurring clock instants marked by a sampling means.

An object of the invention is to provide a novel system for the transmission and reception of such information, in which a number of advantages are present as compared with prior systems.

These advantages are, for example:

With a given bandwidth, a more precise localization of the sampling points (and consequently a finer reproduction at the reception side of the input information at the transmission side), or in other terms, a better discrimination with respect to known systems for data transmission purposes;

As a consequence of the foregoing, the possibility of increasing the information content in a given bandwidth with a conventional discrimination degree;

Possible suppression of the usual phase correctors in the carrier wave channel when a system of the invention is employed in carrier wave equipment;

Less cross-talk between two adjacent channels when signals of the two channels modulate carrier waves mutually 90° out of phase, as a result of larger concentration of information energy towards the middle of the bandwidth.

According to the invention, means are provided to modify the pulses passing through this combination of channels in such manner that at any clock instant at which no pulse appears the output assumes a third D.C. level (e.g. zero), and at any clock instant at which a pulse appears the output assumes either a first D.C. level (e.g. positive) or a second D.C. level (e.g. negative). During any sequence of continuous pulses the output remains at the same level (i.e. first or second level), but upon the occurrence of a pulse at an instant following an instant at which no pulse occurred, the output shifts to the level (first or second) opposite to the level it had before the period of one or more instants during which no pulses occurred. Reshaping means are also provided to modify the shape of the signals so as to adopt said shape to the repetition rate of the clock instants.

In addition, the signal is applied to compression means in the transmitter and conversely, to expansion means in the receiver. As is known, this provides good protection against parasitic disturbances.

A better understanding of the invention will be gained by referring to the following description and to the figures annexed therewith, given by way of example only, for a few embodiments thereof.

Figure 1A:
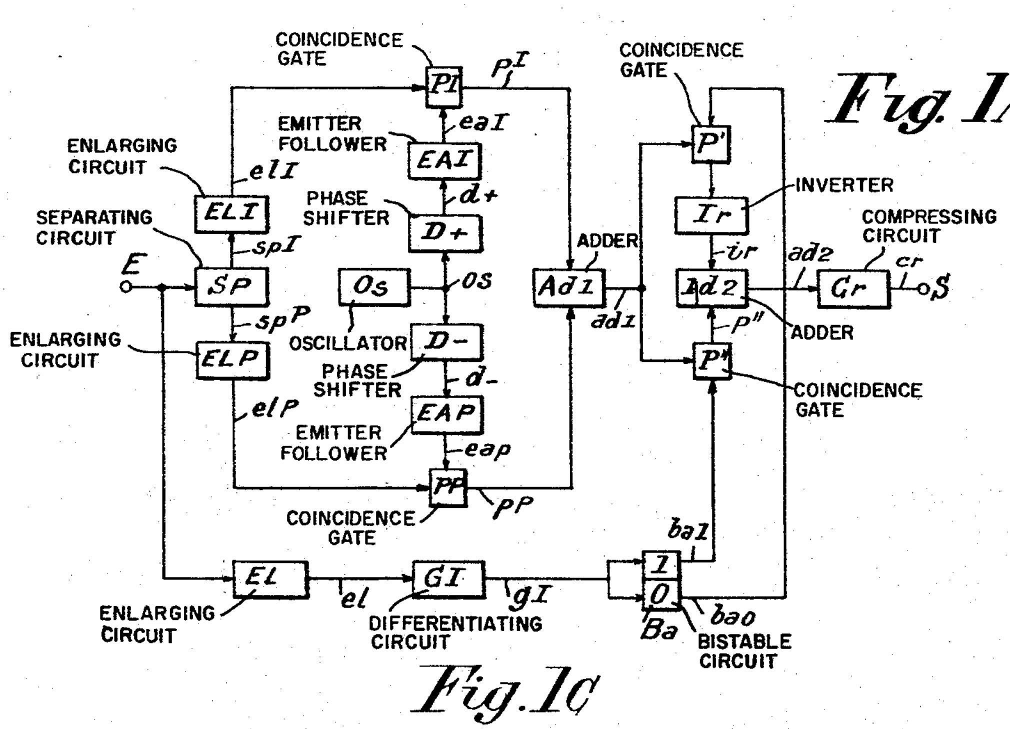
FIGURE 1A shows a block diagram of a transmitting device for transmitting information in a low-pass channel having a cut-off frequency of 3,000 Hz., according to a first embodiment of the invention.
Figure 2:
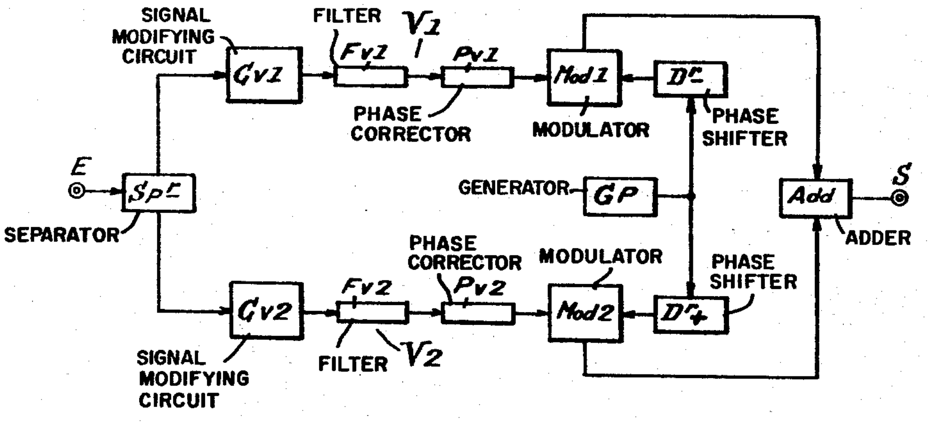
FIGURE 2 shows a block diagram of a transmitting apparatus for transmitting information in a band-pass channel having a bandwidth equal to 3,000 Hz.
Figure 4:
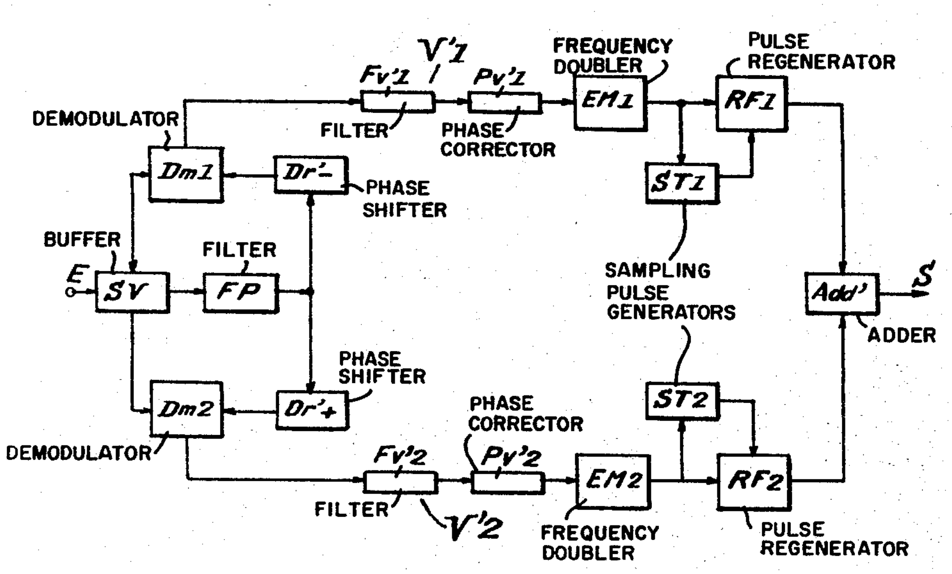
FIGURE 4 shows a block diagram of a receiving apparatus for receiving information transmitted in a band-pass channel.
Figure 3:
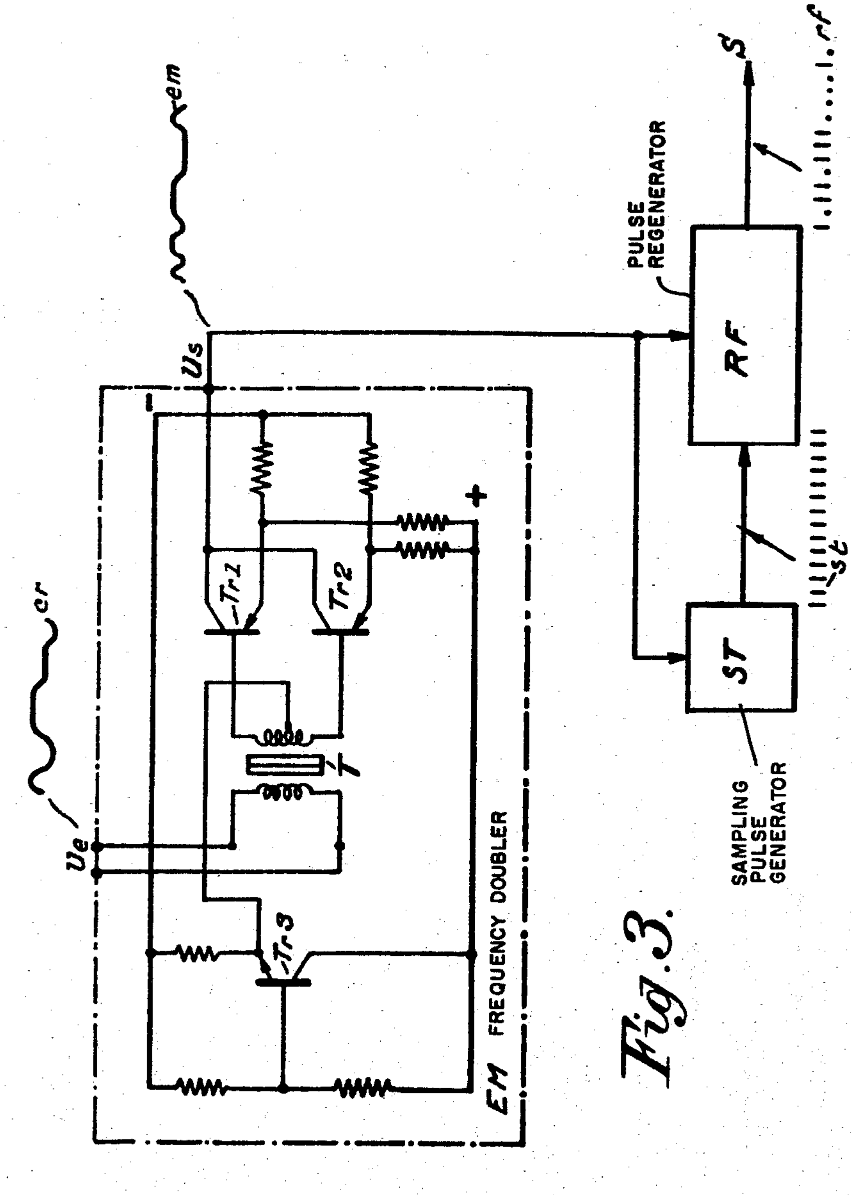
FIGURE 3 shows the schematic diagram, partially illustrated as a circuit diagram and partially illustrated as a block diagram, of a receiving device for receiving information transmitted in a low-pass channel.
Figure 5A:
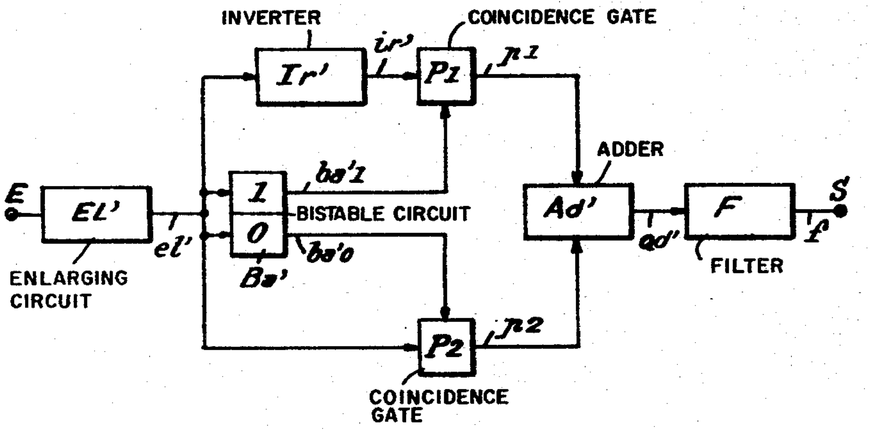
FIGURE 5A is a block diagram of a transmitting device for transmitting information in a low-pass channel according to a variant of the first embodiment of the invention.

It is first to be remarked that a transmitting device as illustrated in FIG. 1A or FIG. 5A has to work in cooperation with a receiving device as shown in FIG. 3, when information is sent through a low-pass channel, to make a complete system. The structure of FIG. 1A will first be discussed in order to explain the invention and then it will be shown that it may be incorporated in a transmitting apparatus (FIG. 2) working on a band-pass channel of a carrier wave telephony equipment, as are also the circuits of FIG. 3 in the receiving apparatus (FIG. 4) of said equipment.

To the input E of the structure illustrated in FIG. 1A are applied the signals from a conventional coding circuit (not shown) that delivers, according to the information to be transmitted, a pulse ("digit" 1), or no pulse ("digit" 0), with a repetition rate of 6,000 digits per second. For illustration the coded information 1 0 1 1 0 1 1 1 1 0 0 0 0 1 0 is inscribed at the top of FIG. 1B.

The original telegraphic signals are first transformed by a known sampling means into such digital information (FIG. 1B, line E) in which every digit 1 is formed by a narrow positive "input" pulse; all input pulses have a same common amplitude and coincide with regularly recurring clock instants. These pulses are applied to the input of a separating circuit SP (FIG. 1A) that distributes the pulses alternately to two channels, so that two distinct series of pulses are applied to the channels. For convenience in description, the pulses of one pulse series (*Sp* 1) are hereinafter referred to as "odd" pulses and the pulses of the other pulse series ($Sp\,2$) are hereinafter referred to as "even" pulses. This designation indicates the relation of the pulses of the two series to the pulses of the original signal.

The odd and even pulses delivered by circuit SP are applied to enlarging circuits ELI and ELP respectively that expand each pulse to have a duration equal to twice the clock period. Circuit ELI produces the signal *el*I and circuit ELP produces the signal *el*P (FIG. 1B).

Figure 1C:
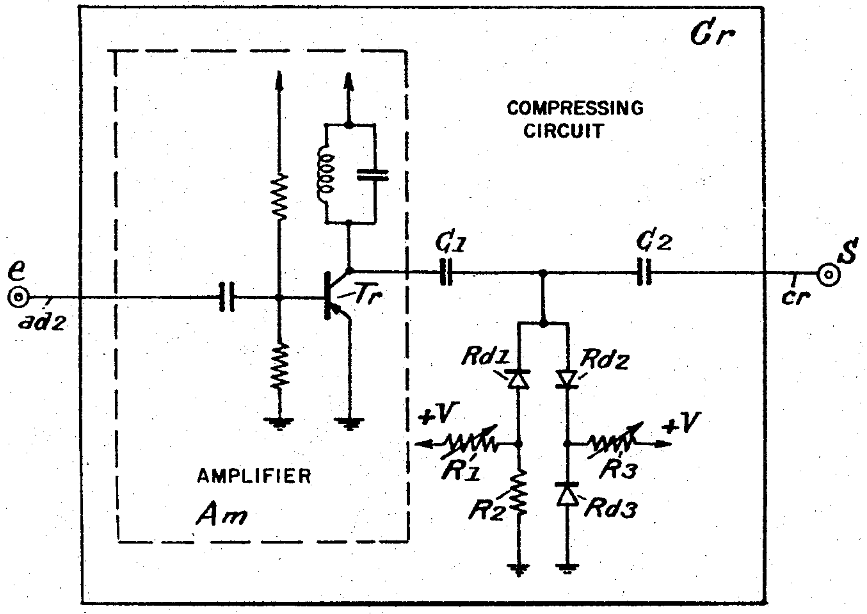
FIGURE 1C is a detailed circuit diagram of block *Cr* in FIG. 1A.
Figure 1B:
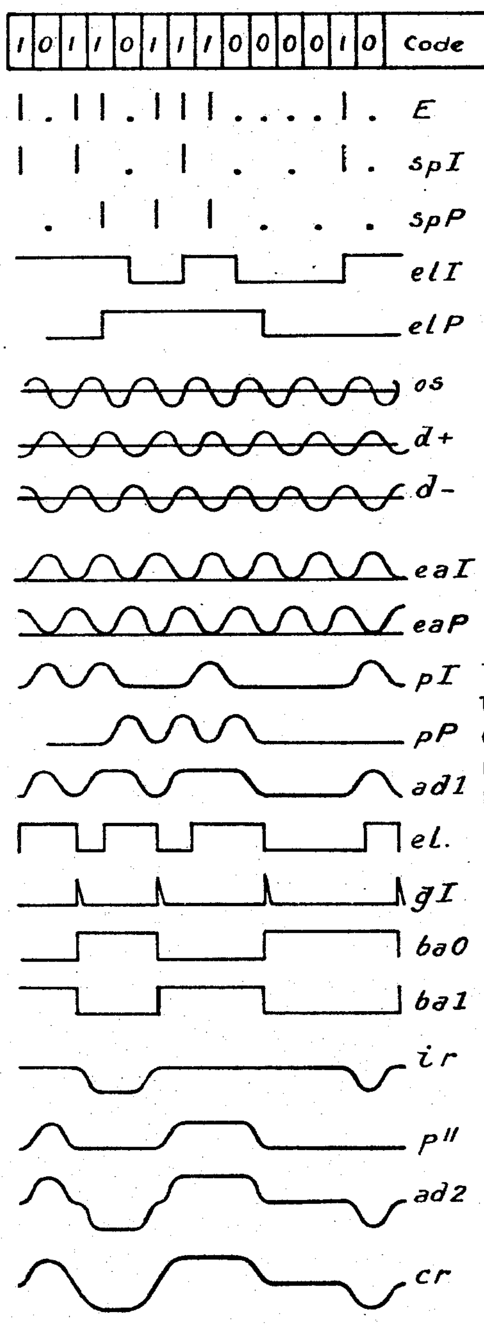
FIGURE 1B shows the graphs of the signals related to a given information, appearing in the diverse circuits of FIG. 1A.

Circuits ELI and ELP (FIG. 1A) are connected to coincidence gates PI and PP respectively in order to obtain raised cosine signals as represented on lines *p*I and *p*P of FIG. 1B by cooperation with circuits O*s*, D+, D−, EAI and EAP (FIG. 1A).

Oscillator OS delivers a sine wave *os* (FIG. 1B) having a frequency equal to half the clock rhythm. This signal *os* is simultaneously applied to the inputs of two phase shifting circuits D+, D− (FIG. 1A) which shift the phase of the oscillations by +45° and −45° respectively so as to form the signals *d*+ and *d*−, FIG. 1B.

The signals *d*+ and *d*− are applied to circuits EAI and EAP respectively, which may, for example, be emitter followers, in order to produce voltages having a continuous raised cosine shape, as shown at *ea*I and *ea*P respectively (FIG. 1B).

Outputs of circuits EAI and EAP are applied to one input terminal of the gates PI and PP respectively, and the signals *el*I and *el*P are applied to the other input terminals of these gates respectively. These gates are biased to transmit the raised cosine signal only when the signal *el*I or *el*P is at a high level of voltage.

The two signals *p*I and *p*P are applied to the two inputs of a first adder A*d*I (FIG. 1A) for producing the signal illustrated at *ad*I (FIG. 1B).

The coded input pulses from E are also applied to a third enlarging circuit EL (FIG. 1A), which expands each pulse to have a duration of one clock period, to produce signals *el* (FIG. 1B). These signals are applied to a differentiating circuit GI in such manner that for every trailing edge of the positive going pulses of *el*, a brief positive pulse is produced (line *g*I, FIG. 1B). The brief pulses *g*I are applied to a bi-stable flip-flop B*a*. The signals *ba*0 and *ba*1 (see FIG. 1B), which appear at the two outputs of circuit BA, are applied to one input terminal of coincidence gates P′ and P″ respectively. The signal *ad*1 is applied to the other input terminal of each of these gates. When gate P′ is closed, gate P″ is open, and vice versa.

The signal *ad*1 is directly transmitted through gate P″ to the adder A*d*2; and it is transmitted to the same adder through gate $P^1$ after its polarity is reversed by passing through an inverter I*r*.

Thus at the output of adder A*d*2 there appears a signal *ad*2 (FIG. 1B). This signal passes through a compressing circuit C*r* (FIG. 1A) having a parabolic response characteristic that transforms *ad*2 into *cr* (bottom line, FIG. 1B). Thus the transient parts of the signal having a sinusoidal form corresponding to a certain frequency are transformed into transient parts pertaining to a sinusoidal signal having a frequency divided by 2 with respect to the latter.

Circuit C*r* is shown in detail in FIG. 1C.

A transistor amplifier A*m* having a high internal resistance is loaded by a diode compressing network. The current circulating through this network is proportional to the signal applied to the base of the transistor T*r* and must be practically independent of the load. The tuned circuit connected to the collector electrode of the transistor possesses a very high impedance with respect to the load; it is tuned to a central frequency in the band allotted to the transmission.

The collector electrode is connected to the diode network by a condenser C1. The network includes two identical diodes R*d*1 and R*d*2 connected with opposite polarities to C1, and practically constitute for circuit A*m* a load varying with the signal applied thereto. The other end of diode R*d*1 is connected through an adjustable resistor R1, to a source of voltage −V and through another resistor R2 to ground. The other end of diode R*d*2 is connected through an adjustable resistor R′3 to the other terminal of the voltage source −V and through another diode R*d*3 to ground. Resistor R′1 is adjusted so as to produce between said other ends of diodes R*d*1 and R*d*2 a bias voltage such that the working point of said diodes is in the parabolic part of their characteristic curve.

The current through diode R*d*3 is adjusted by resistor R′3 so as to obtain a temperature stabilization of diodes R*d*1 and R*d*2. Diode R*d*3 is biased to the linear part of its characteristic curve and has a small impedance for variable currents. Resistor R2 is of the same value of resistance as diode R*d*3 for variable currents. These measures will ensure that the diode network works in the parabolic part of its characteristic curve in spite of temperature variations.

Thus as a result of the transformations provided by the invention it is possible (as confirmed by experiments) to transmit, in a low-pass channel having a bandwidth of 3,000 Hz., a signal presenting a repetition rate of 6,000 bauds.

FIG. 2 shows the transmitting circuits that are necessary to send digital information in a band-pass channel having a bandwidth equal to 3,000 Hz. in carrier wave equipment. For that purpose the signal is transposed by amplitude modulation onto a carrier wave having a frequency situated in the middle of the band considered.

With the circuit shown in FIG. 2 it was possible to transmit at a rate of 6,000 bauds. In this circuit there are two channels V1 and V2 with carrier waves having a same frequency, but mutually shifted by 90° of phase. A separator S*pr* (similar to SP in FIG. 1A) receives the input digits at the rate of 6,000 bauds and separates the odd and even digits; thus two signals are formed, each having a rate of 3,000 bauds, and these two signals are transformed separately in the channels V1 and V2.

Both channels have the same structure. Their elements are designated with a reference 1 or 2 according to the channel considered. In channel V1 for instance the digits are first applied to a signal modifying circuit CV1 of the type shown in FIG. 1A. They are thus separated for a second time, transformed, recombined and compressed into the manner described with reference to FIG. 1A. Then they pass through a low-pass filter F*v*1 having a cut-off frequency a little greater than 1,500 Hz. This filter eliminates the spurious part of the spectrum outside the transmission channel without appreciably modifying the transmitted part below 1,500 Hz. After passing the filter F*v*1, the signals are applied to a phase corrector P*v*1 so as to linearize the phase with respect to frequency in the channel band.

Then the signals of both channels are applied to the necessary modulators (Mod 1, Mod 2) and are recombined in an adder Add.

A carrier wave generator GP generates the carrier voltage which is shifted with a lag or a lead respectively by means of 45° phase-shifters D*r*+, D*r*−. It is to be remarked that in a structure similar to FIG. 2 the two channels may convey two absolutely different signals each having a rate of 3,000 bauds. Of course it is then not possible to recombine the two signals in an adder (Add) and the two signals have to be transmitted separately.

FIG. 3 shows a circuit for receiving signals transmitted by a transmitting device according to FIG. 1A, i.e., in a low-pass channel. The signals are applied to a known type of frequency doubler EM at terminal U*e*. The transistors T*r*1 and T*r*2 of the same type, as alternately and oppositely closed and opened depending upon the polarity of the signal transmitted through transformer T. The bias voltage for both transistors T*r*1 and T*r*2 is provided by a transistor T*r*3 of opposed conduction type, in order to provide exact temperature compensation. Such a known circuit is preferably adjusted in such manner that its characteristic curve has a parabolic form.

The output signal delivered at the common collector circuit of both transistors *Tr*1 and *Tr*2 is applied to a generator *St* of synchronized sampling pulses, and also to a regenerating circuit RF. The pulses delivered by generator ST are synchronized by signal *en* and applied to pulse regenerator circuit RF that reproduces, as a series of digits, a signal *rf* similar to the input signal E (FIG. 1B).

When information is transmitted through a band-pass channel, a transposition in frequency that is reciprocal to the transposition at the transmitter is necessary at the receiver. FIG. 4 shows the circuits employed for this purpose.

Let us recall that the signals received are amplitude modulation products distributed on both sides of the medium frequency in the pass-band channel on two channels having carrier waves mutually shifted by 90°. These signals are applied at E to the input of a buffer SV. The outputs of buffer SV are connected to two demodulators D*m*1 and D*m*2 and the signals after having passed through these demodulators reproduce the signal of channels V1 and V2 in FIG. 2, that is to say, their pulses represent respectively the odd digits and the even digits among the initial input pulses.

The carrier wave is filtered out by means of filter FP and applied through phase shifters D*r*'− and D*r*'+ (similar to D*r*− and D*r*+ in FIG. 2) to the demodulators D*m*1 and D*m*2 for demodulating the signals.

There are two similar separate receiving channels V'1, V'2 that merge into one common output channel. In each of the channels V'1 and V'2 the elements are distinguished by the numerals 1 and 2 respectively.

In channel V'1 for instance the signals are transmitted from the output of demodulator D*m*1 to a frequency doubler EMI (identical to EM, FIG. 3) by way of a low-pass filter F*v*'1 and a phase corrector P*v*'1. The circuits ST1 and RF1 are similar to ST and RF in FIG. 3.

The signals delivered by RF1 and RF2 are narrow positive pulses which represent respectively odd and even digits and they are applied to an adder Add' that supplies a reproduction of the initial input signal E (FIG. 1B) at its output terminal S.

Figure 5B:
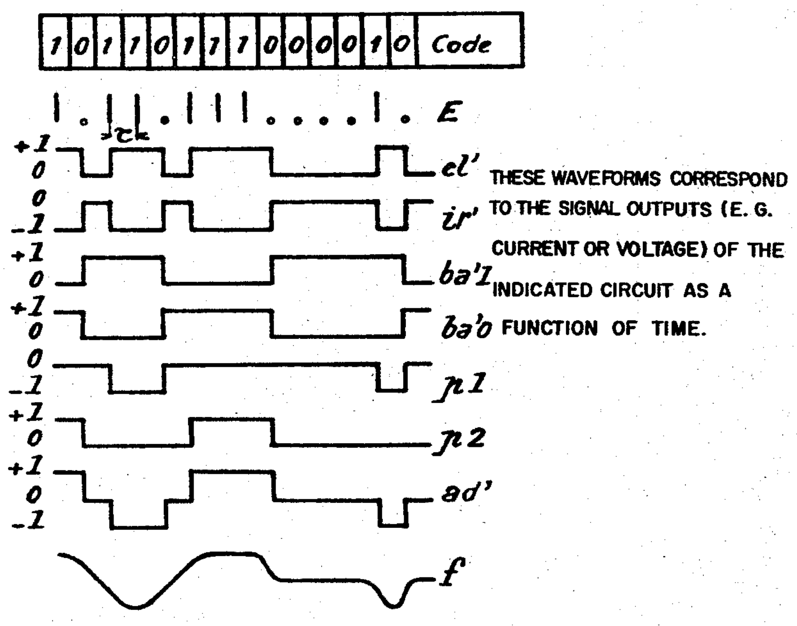
FIGURE 5B shows the graphs of the signals related to a given information, appearing in the circuits of FIG. 5A.

FIGS. 5A and 5B illustrate, similarly to FIGS. 1A and 1B, a modification of the first embodiment of the invention that was described with reference to the latter figures. It is supposed that the same series of input digits (1 0 1 1 0 1 1 1 0 0 0 0 1 0) is to be transmitted. In FIG. 5A the input pulses are applied to a common enlarging circuit EL' similar to EL (FIG. 1A). The signal *el'* at the output of circuit EL' is applied directly to the bistable flip-flop B*a*' and the coincidence gate P2, and also, by way of the inverter I*r*', to the coincidence gate P1.

Flip-flop B*a*' permutes its two states of equilibrium, that is to say changes over from "0" to "1" or reversely, under control of signal *el'* whenever the latter passes from level +1 to level 0 (see left column, FIG. 5B). The flip-flop B*a*' in its state "1" produces on its corresponding output a positive polarity voltage (signal *ba'*1, whereas signal *ba'*0 is zero) so as to ensure the unblocking of gate P1. Conversely, when flip-flop B*a*' is in its state "0," the signal *ba'*0 is positive, which entails unblocking of gate P2. These two gates are then alternately opened and blocked under control of the flip-flop to permit the transfer either of the direct signal *el'* or the reversed signal *ir'*. A signal *p*1 having a value 0 or a negative polarity is produced at the output of gate P1, and a signal *p*2 having a value 0 or a positive polarity is produced at the output of gate P2.

Signals *p*1 and *p*2 are added in circuit A*d*' (FIG. 5A) to produce signal *ad'* (FIG. 5B). The latter signal is applied to the input of a low-pass filter F having a critical frequency equal to 3,000 Hz., for producing a signal having the shape illustrated at *f* (FIG. 5B). The circuit of FIG. 5A produces a signal having approximately the same form as the signal *cr* (FIG. 1B), and this signal may be either transmitted directly in a low-pass channel or transposed in frequency by means of a carrier wave so as to be sent through a pass-band channel.

Filter F has, at least approximately, a transmission characteristic curve as shown on FIG. 10, page 740 of the review "Bell System Technical Journal" of May 1954, and is associated with a network connected thereto for modification of its frequency characteristic so as to obtain the same response for impulses, when pulse duration is prolonged to the pulse interval, as taught by FIG. 17 of the same review.

While there have been disclosed herein certain preferred embodiments and modifications of the present invention, it is to be understood that various modifications, omissions and refinements which depart from the disclosed specification may be adopted without abandoning the spirit and transgressing the scope of the present invention.

I claim:

1. An information transmission system of the type in which information to be transmitted is in the form of a coded series of common amplitude pulses which occur only at clock instants, said system comprising a source of said coded series of pulses, means for converting said series of pulses to a coded signal having separately occurring first and second levels corresponding to the occurrence of pulses in said series of pulses and a third intermediate level corresponding to the absence of pulses in said series of pulses at said clock instants, said converting means comprising means responsive to each absence of a pulse of said series of pulses at a clock instant immediately following the occurrence of a pulse at a clock instant for shifting the level of said signal at the next occurrence of a pulse of said pulse series at a clock instant to the one of said first and second levels different than the level it had immediately prior to the instant at which no pulse occurred, and means for reshaping said coded signals to produce an output signal, said reshaping means comprising a compression circuit having a parabolic response characteristic whereby only the transient parts of said coded signals are transformed to sinusoidal form of a frequency lower than the repetition frequency of said clock instants.

2. The system of claim 1 in which said transforming means comprises means for shaping transient parts of said coded signals to have a sinusoidal form of a frequency that is one-fourth of the repetition frequency of said clock instant.

3. An information transmission system of the type in which information to be transmitted is in the form of a coded series of common amplitude pulses which occur only at clock instants, said system comprising a source of said coded series of pulses, means for converting said series of pulses to a coded signal having separately occurring first and second levels corresponding to the occurrence of pulses in said series of pulses and a third intermediate level corresponding to the absence of pulses in said series of pulses at said clock instants, said converting means comprising means for shifting said signal between said first and second levels in response to each absence of a pulse of said series of pulses at a clock instant, immediately following the occurrence of a pulse of said pulse series at a clock instant, means for reshaping said coded signals to produce an output signal, said reshaping means comprising means for transforming only the transient parts of said coded signals to sinusoidal form of a frequency lower that the repetition frequency of said clock instant, and receiver means for said reshaped coded signals, said receiver comprising frequency doubling means, means applying said reshaped coded signals to said doubling means, pulse generator means, means synchronizing said generator means with the output of said doubling means, and pulse regenerator means controlled by the outputs of said doubling means and pulse generator means.

4. An information transmission system of the type in which information to be transmitted is in the form of a coded series of common amplitude pulses which occur only at clock instants, said system comprising a source of said coded series of pulses, means for producing first and second signals of opposite polarity corresponding to said series of pulses, output circuit means, gate means for selectively applying said first and second signals to said output circuit means, and bistable circuit means for controlling said gate means, said bistable circuit means being responsive to the absence of a pulse at any clock instant following a clock instant at which a pulse appeared, whereby a three level coded signal is applied to said output circuit means, said three level signal having first and second levels corresponding to the occurrence of pulses at clock instants and a third intermediate level corresponding to the absence of pulses at a clock instant, and the level of said coded signal shifts in response to the next pulse following each absence of a pulse at a clock instant following a clock instant at which a pulse appeared to the one of said first and second levels different than the level it had immediately prior to the absence of a pulse, said output circuit means comprising means for reshaping transient parts of the coded signals applied thereto to have the shape of portions of a sinusoidal wave with a frequency that is one-fourth the frequency of said clock instants.

5. An information transmission system of the type in which information to be transmitted is in the form of a coded series of common amplitude pulses which occur only at clock instants, said system comprising a source of said coded series of pulses, means for producing first and second signals of opposite polarity corresponding to said series of pulses, output circuit means, gate means for selectively applying said first and second signals to said output circuit means, enlarging circuit means connected to said source for enlarging said pulses to have durations equal to the period of said clock instants, means for differentiating said enlarged pulses to produce a control pulse at each absence of a pulse of said series at a clock instant following the occurrence of a pulse of said series of pulses at a clock instant, bistable circuit means for controlling said gate means and means for applying said control pulses to said bistable circuit means whereby said bistable circuit means changes its state upon each occurrence of a control pulse to change the signal of said first and second signals applied to said output circuit means, said output circuit means comprising means for reshaping transient parts of the signals applied thereto to have the shape of portions of a sinusoidal wave of a frequency that is one-fourth the frequency of said clock instants.

6. An information transmission system of the type in which information to be transmitted is in the form of a coded series of common amplitude pulses which occur only at clock instants, said system comprising a source of said coded series of pulses, first and second channels, means for applying said coded series of pulses to said first and second channels at alternate clock instants to form first and second pulse series respectively, means for enlarging the widths of the pulses of said first and second series to have widths twice the period of said clock instants, means for transforming the pulses of said enlarged first and second series of pulses to raised sinusoidal form, the frequency of said sinusoidal form being half the frequency of said clock instants, means for adding transformed series of pulses, means for producing first and second opposite polarity signals corresponding to said transformed series of pulses, output circuit means, gate means for selectively applying said first and second signals to said output circuit means, and means for controlling said gate means comprising means responsive to only the first absence of a pulse of said coded series at a clock instant following a pulse of said coded series at the preceding clock instant, whereby the signals applied to said output circuit means have first and second levels corresponding to the occurrence of pulses of said coded series and an intermediate level corresponding to the absence of a pulse of said coded series at a clock instant, and the level of the signals applied to said output circuit before the occurrence of signals at said intermediate level is always different than the level after the occurrence of signals at said intermediate level.

7. The system of claim 6 in which said output circuit comprises means for reshaping transient parts of the signals applied thereto to have the shape of portions of a sinusoidal wave with a frequency that is one-fourth the frequency of said clock instants.

8. The system of claim 6 in which said means for transforming comprises a source of oscillations of frequency one-half the repetition frequency of said clock instants, first and second gate means, phase shift means applying said oscillations to said gate means, and means applying said first and second series of pulses to said first and second gate means respectively as control signals.

9. An information transmission system of the type in which information to be transmitted is in the form of a coded series of common amplitude pulses which occur only at clock instants, said system comprising a source of said coded series of pulses, means for enlarging the pulses of said series of pulses to have durations equal to the time between clock instants, first and second coincidence gate means, means applying said enlarged pulses directly to said first coincidence gate means, inverter means for applying said enlarged pulses to said second coincidence gate means, bistable circuit means, means for applying said enlarged pulses to said bistable circuit means whereby said bistable circuit means changes its state at all trailing edges of enlarged pulses that are not immediately followed by other enlarged pulses, means applying the output of said bistable circuit means with opposite polarity to said first and second gate means, means for adding the outputs of said first and second gate means to produce a signal having first and second levels corresponding to the occurrence of pulses in said series of pulses at clock instants and a third intermediate level corresponding to the absence of pulses in said series of pulses at clock instants, and means for reshaping transient portions of the output of said adding means to have the shape of portions of a sinusoidal wave of a frequency that is one-fourth the frequency of said clock instants.

10. An information transmission system of the type in which information to be transmitted is in the form of a coded series of common amplitude pulses which occur only at clock instants, said system comprising a source of said coded series of pulses, means for separating said series of pulses into first and second series of pulses corresponding to said coded series of pulses at alternate clock intants, means for converting each of said first and second series of pulses to first and second coded signals respectively having separately occurring first and second levels corresponding to the occurrence of pulses of said first and second series respectively and a third intermediate level corresponding to the absence of pulses of said first and second series respectively, said converting means comprising means responsive to the absence of a pulse in the respective series immediately following the occurrence of a pulse in the respective series for shifting the level of the respective signal at the next occurrence of a pulse in the respective series at a clock instant to the one of said first and second levels different than the level it had immediately prior to the instant at which no pulse occurred, means for reshaping only the transient parts of said first and second series of pulses to sinusoidal form of a frequency lower that the repetition frequency of said clock instant, a source of first and second carrier oscillations that have a phase difference of ninety degrees, means for modulating said reshaped first and second pulse series on said first and second oscillations respectively, means for combining said modulated carrier oscillations, and means for transmitting said combined modulated oscillations.

References Cited

UNITED STATES PATENTS

| | | | |
|---|---|---|---|
| 2,700,696 | 1/1955 | Barker | 340—347 X |
| 3,154,777 | 10/1964 | Thomas | 178—68 X |
| 3,162,724 | 12/1964 | Ringelhaan | 178—68 |
| 3,204,029 | 8/1965 | Groff | 178—68 |
| 3,233,236 | 2/1966 | Katzenstein et al. | 340—347 |
| 3,242,262 | 3/1966 | Melas et al. | 178—66 |

OTHER REFERENCES

A. P. Brogle; USASRDL Technical Report 1954, A Comparison of Transmission Methods for Pulse Code Modulation Communication Systems, Oct. 27, 1958, page 33.

JOHN W. CALDWELL, *Acting Primary Examiner.*

DAVID G. REDINBAUGH, *Examiner.*

S. J. GLASSMAN, W. S. FROMMER, *Assistant Examiners.*